United States Patent
Parvaix et al.

(10) Patent No.: US 11,540,072 B2
(45) Date of Patent: Dec. 27, 2022

(54) REVERBERATION FINGERPRINT ESTIMATION

(71) Applicant: Magic Leap, Inc., Plantation, FL (US)

(72) Inventors: Mathieu Parvaix, Santa Clara, CA (US); Jean-Marc Jot, Aptos, CA (US); Colby Nelson Leider, Coral Gables, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/686,025

(22) Filed: Mar. 3, 2022

(65) Prior Publication Data
US 2022/0272469 A1 Aug. 25, 2022

Related U.S. Application Data

(63) Continuation of application No. 17/079,212, filed on Oct. 23, 2020, now Pat. No. 11,304,017.
(Continued)

(51) Int. Cl.
*H04R 3/00* (2006.01)
*H04R 29/00* (2006.01)
*H04R 1/08* (2006.01)

(52) U.S. Cl.
CPC ............... *H04R 29/00* (2013.01); *H04R 1/08* (2013.01); *H04R 3/00* (2013.01)

(58) Field of Classification Search
CPC ... H04R 1/08; H04R 1/10; H04R 3/00; H04R 3/005; H04R 3/04; H04R 3/12;
(Continued)

(56) References Cited

U.S. PATENT DOCUMENTS

| 4,953,219 | A | 8/1990 | Kasai et al. |
| 5,491,754 | A | 2/1996 | Jot |

(Continued)

FOREIGN PATENT DOCUMENTS

| GB | 2536020 A | 9/2016 |
| WO | 2018026828 A1 | 2/2018 |
| WO | 2019079523 A1 | 4/2019 |

OTHER PUBLICATIONS

Chinese Notice of Allowance dated May 7, 2022, for CN Application No. 201880067405.3, with English translation, 4 pages.
(Continued)

*Primary Examiner* — Thang V Tran
(74) *Attorney, Agent, or Firm* — Morrison & Foerster LLP

(57) ABSTRACT

Examples of the disclosure describe systems and methods for estimating acoustic properties of an environment. In an example method, a first audio signal is received via a microphone of a wearable head device. An envelope of the first audio signal is determined, and a first reverberation time is estimated based on the envelope of the first audio signal. A difference between the first reverberation time and a second reverberation time is determined. A change in the environment is determined based on the difference between the first reverberation time and the second reverberation time. A second audio signal is presented via a speaker of a wearable head device, wherein the second audio signal is based on the second reverberation time.

20 Claims, 11 Drawing Sheets

Related U.S. Application Data

(60) Provisional application No. 62/926,330, filed on Oct. 25, 2019.

(58) Field of Classification Search
CPC .......... H04R 5/033; H04R 5/04; H04R 29/00; H04R 29/001; H04R 29/007; H04R 2460/07; G10K 15/00; G10K 15/08; G10K 15/10; G10K 11/18; H04S 5/00; H04S 7/00; H04S 7/303; H04S 7/304; G01H 7/00; G02B 27/017; G02B 27/0178
See application file for complete search history.

(56) References Cited

U.S. PATENT DOCUMENTS

| | | | |
|---|---|---|---|
| 5,812,674 A | 9/1998 | Jot | |
| 6,188,769 B1 | 2/2001 | Jot | |
| 6,453,047 B1 | 9/2002 | Dicker | |
| 6,665,407 B1 | 12/2003 | Dicker | |
| 6,798,889 B1 | 9/2004 | Dicker | |
| 6,917,686 B2 | 7/2005 | Jot | |
| 6,978,027 B1 | 12/2005 | Dahl | |
| 7,099,482 B1 | 8/2006 | Jot | |
| 7,149,314 B2 | 12/2006 | Dahl | |
| 7,231,054 B1 | 6/2007 | Jot | |
| 7,257,231 B1 | 8/2007 | Avendano | |
| 7,315,624 B2 | 1/2008 | Avendano | |
| 7,412,380 B1 | 8/2008 | Avendano | |
| 7,561,699 B2 | 7/2009 | Jot | |
| 7,567,845 B1 | 7/2009 | Avendano | |
| 7,848,531 B1 | 12/2010 | Vickers | |
| 7,928,311 B2 | 4/2011 | Trivi | |
| 7,970,144 B1 | 6/2011 | Avendano | |
| 8,000,485 B2 | 8/2011 | Walsh | |
| 8,019,093 B2 | 9/2011 | Avendano | |
| 8,107,631 B2 | 1/2012 | Merimaa | |
| 8,280,077 B2 | 10/2012 | Avendano | |
| 8,345,899 B2 | 1/2013 | Merimaa | |
| 8,374,365 B2 | 2/2013 | Goodwin | |
| 8,379,868 B2 | 2/2013 | Goodwin | |
| 8,488,796 B2 | 7/2013 | Jot | |
| 8,619,998 B2 | 12/2013 | Walsh | |
| 8,712,061 B2 | 4/2014 | Jot | |
| 8,831,255 B2 | 9/2014 | Crawford | |
| 8,879,750 B2 | 11/2014 | Walsh | |
| 8,908,874 B2 | 12/2014 | Johnston | |
| 9,014,377 B2 | 4/2015 | Goodwin | |
| 9,042,565 B2 | 5/2015 | Jot | |
| 9,197,979 B2 | 11/2015 | Lemieux | |
| 9,253,574 B2 | 2/2016 | Thompson | |
| 9,386,373 B2 | 7/2016 | Ma | |
| 9,391,579 B2 | 7/2016 | Walsh | |
| 9,432,790 B2* | 8/2016 | Raghuvanshi | .......... A63F 13/54 |
| 9,496,850 B2 | 11/2016 | Jot | |
| 9,530,421 B2 | 12/2016 | Jot | |
| 9,591,427 B1 | 3/2017 | Lyren | |
| 9,697,844 B2 | 7/2017 | Walsh | |
| 9,728,181 B2 | 8/2017 | Jot | |
| 9,754,597 B2 | 9/2017 | Jot | |
| 9,779,731 B1 | 10/2017 | Haskin et al. | |
| 9,794,721 B2 | 10/2017 | Goodwin | |
| 9,865,245 B2 | 1/2018 | Kamdar | |
| 9,924,289 B2 | 3/2018 | Trivi | |
| 10,038,967 B2 | 7/2018 | Jot | |
| 10,063,207 B2 | 8/2018 | Malak et al. | |
| 10,616,705 B2 | 4/2020 | Schmidt | |
| 10,645,520 B1* | 5/2020 | Amengual Gari | .. G10L 21/0232 |
| 10,674,307 B1 | 6/2020 | Robinson et al. | |
| 10,685,641 B2* | 6/2020 | Asada | .................... H04R 5/033 |
| 10,735,884 B2 | 8/2020 | Audfray et al. | |
| 10,863,301 B2 | 12/2020 | Schmidt | |
| 11,304,017 B2 | 4/2022 | Parvaix et al. | |
| 2003/0159569 A1 | 8/2003 | Ohta | |
| 2007/0160241 A1 | 7/2007 | Joublin | |
| 2007/0173730 A1 | 7/2007 | Bikko | |
| 2009/0220100 A1 | 9/2009 | Ohta et al. | |
| 2011/0235813 A1 | 9/2011 | Gauger, Jr. | |
| 2011/0251704 A1 | 10/2011 | Walsh | |
| 2012/0093320 A1 | 4/2012 | Flaks | |
| 2013/0041648 A1 | 2/2013 | Osman | |
| 2013/0236040 A1 | 9/2013 | Crawford | |
| 2014/0270184 A1 | 9/2014 | Beaton | |
| 2014/0282663 A1 | 9/2014 | Lee | |
| 2014/0320389 A1 | 10/2014 | Scavezze | |
| 2015/0302652 A1 | 10/2015 | Miller | |
| 2015/0380010 A1 | 12/2015 | Srinivasan | |
| 2016/0088417 A1 | 3/2016 | Kim | |
| 2016/0212272 A1 | 7/2016 | Srinivasan | |
| 2017/0041445 A1* | 2/2017 | Ukai | ................... H04M 1/6016 |
| 2017/0080229 A1 | 3/2017 | Meister | |
| 2017/0126194 A1 | 5/2017 | Jot | |
| 2017/0127212 A1 | 5/2017 | Jot | |
| 2017/0208415 A1 | 7/2017 | Ojala | |
| 2017/0208416 A1 | 7/2017 | Petrov | |
| 2017/0223478 A1 | 8/2017 | Jot | |
| 2017/0230760 A1 | 8/2017 | Sanger et al. | |
| 2017/0238119 A1 | 8/2017 | Schlecht et al. | |
| 2017/0325043 A1 | 11/2017 | Jot | |
| 2018/0045963 A1 | 2/2018 | Hoover et al. | |
| 2018/0206046 A1* | 7/2018 | Rosenkranz | ......... H04R 25/405 |
| 2018/0359582 A1* | 12/2018 | Belhomme | .......... H04R 29/001 |
| 2019/0116448 A1* | 4/2019 | Schmidt | ................. H04S 3/008 |
| 2019/0387352 A1* | 12/2019 | Jot | .......................... H04R 3/04 |
| 2020/0381007 A1 | 12/2020 | Hur et al. | |
| 2020/0382895 A1 | 12/2020 | Schissler | |
| 2021/0084357 A1 | 3/2021 | Tajik et al. | |
| 2021/0110809 A1 | 4/2021 | Lastrucci | |
| 2021/0127220 A1 | 4/2021 | Parvaix et al. | |
| 2021/0160647 A1 | 5/2021 | Schmidt et al. | |

OTHER PUBLICATIONS

Chinese Office Action dated Apr. 20, 2022, for CN Application No. 201980012962.X, with English translation, 13 pages.

Chinese Office Action dated Feb. 15, 2022, for CN Application No. 201880067405.3, with English translation, 4 pages.

Indian Office Action dated Apr. 22, 2022, for IN Application No. 202047020450, with English translation, 7 pages.

International Preliminary Report on Patentability and Written Opinion, dated May 5, 2022, for PCT Application No. PCT/US2020/057203, filed Oct. 23, 2020, six pages.

Israeli Notice of Allowance dated Jul. 13, 2022, for IL Application No. 273755, three pages.

Notice of Allowance dated Aug. 10, 2022, for U.S. Appl. No. 16/970,331, filed Aug. 14, 2020, eight pages.

Audfray, R. et al. (2018). "Practical Realization of Dual-Shelving Filter Using Proportional Parametric Equalizers," Audio Eng. Society 145th Convention, Paper 10054, Oct. 17-20, 2018, New York, NY, seven pages.

Audfray, R. et al. (2019). "Headphone Technology," 2019 AES International Conference, Aug. 27-29, 2019, San Francisco, CA, Powerpoint presentation, 28 slides.

Avendano, C. (Jun. 2002). "Frequency Domain Techniques for Stereo to Multichannel Upmix," Audio Eng. Society, 22nd International Conf. for Virtual, Synthetic, and Entertainment Audio, 10 pages.

Avendano, C. et al. (Apr. 2002). "Ambience Extraction and Synthesis from Stereo Signals for Multi-channel Audio Up-mix," IEEE ICASSP (International Conf. Acoustics, Speech and Signal Processing), pp. II-1957-II-1960.

Avendano, C. et al. (Jul./Aug. 2004). "A Frequency-Domain Approach to Multichannel Upmix," Journal of the Audio Engineering Society 52:7/8, 12 pages.

Chinese Office Action dated Jan. 24, 2022, for CN Application No. 201980012962.X, with English translation, 16 pages.

Chinese Office Action dated May 25, 2021, for CN Application No. 201980012962.X, with English translation, 16 pages.

Chinese Office Action dated Sep. 18, 2021, for CN Application No. 201880067405.3, with English translation, 12 pages.

(56) References Cited

OTHER PUBLICATIONS

Dahl, L. et al. (Dec. 2000). "A Reverberator Based on Absorbent All-Pass Filters," Proceedings of the COST G-6 Conference on Digital Audio Effects (DAFX-00), Verona, Italy, Dec. 7-9, 2000, six pages.
European Search Report dated Mar. 10, 2021, for EP Application No. 19754505.6, eleven pages.
European Search Report dated Nov. 10, 2020, for EP Application No. 18867954.2, twelve pages.
Ex Parte Quayle Office Action dated Nov. 8, 2021, for U.S. Appl. No. 17/079,212, filed Oct. 23, 2020, 12 pages.
Final Office Action dated Oct. 6, 2021, for U.S. Appl. No. 16/970,331, filed Aug. 14, 2020, nine pages.
Funkhouser, T. et al. (2003). "Survey of Methods for Modeling Sound Propagation in Interactive Virtual Environment Systems," Presence 53 pages.
Funkhouser, T. et al. (Jul. 2002). "Sounds Good to Me! Computational Sound for Graphics, VR, and Interactive Systems," SIGGRAPH Course Notes, 43 pages.
Goodwin, M. M. et al. (Mar. 2007). "Multichannel Surround Format Conversion and Generalized Upmix," 30th International Conf. Audio Engineering Society, Saarislka, Finland, Mar. 15-17, 2007, nine pages.
Goodwin, M. M. et al. (May 2006). "A Frequency-domain Framework for Spatial Audio Coding Based on Universal Spatial Cues," Convention Paper 6751, Audio Engineering Society, 120th Conv., Paris, France, May 20-23, 2006, 12 pages.
Goodwin, M. M. et al. (Oct. 2006). "Analysis and Synthesis for Universal Spatial Audio Coding," Convention Paper 6874, Audio Engineering Sciety, 121st Conv., San Francisco, California, Oct. 5-8, 2006, 11 pages.
Goodwin, M. M. et al. (Oct. 2007). "Binaural 3-D Audio Rendering Based on Spatial Audio Scene Coding," Convention Paper 7277, Audio Engineering Society, 123rd Conv., New York, New York, Oct. 5-8, 2007, 12 pages.
Goodwin, M.M. et al. (Apr. 2007). "Primary-Ambient Signal Decomposition and Vector-Based Localization for Spatial Audio Coding and Enhancement," Proc. IEEE ICASSP (2007 International Conf. on Acoustics, Speech and Signal Processing), pp. I-9-I-12.
Goodwin, M.M. et al. (Oct. 2008). "Spatial Audio Scene Coding," Convention Paper 7507, Audio Engineering Society, 125th Convention, San Francisco, California, Oct. 2-5, 2008, eight pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf, 22 pages.
International Preliminary Report on Patentability dated Aug. 18, 2020, for PCT Application No. PCT/US2019/18368, filed Feb. 15, 2019, five pages.
International Preliminary Report on Patentability dated Apr. 30, 2020, for PCT Application No. PCT/US2018/056385, eleven pages.
International Search Report and Written Opinion, dated Jan. 26, 2021, for PCT Application No. PCT/US2020/057203, filed Oct. 23, 2020, eleven pages.
International Search Report and Written Opinion, dated May 8, 2019, for PCT Application No. PCT/US2019/18368, filed Feb. 15, 2019, eleven pages.
International Search Report dated Jan. 3, 2019, for PCT Patent Application No. PCT/US2018/056385, filed Oct. 17, 2018, three pages.
Johnston, J.D. et al. (Nov. 2010). "Beyond Coding—Reproduction of Direct and Diffuse Sounds in Multiple Environments," Convention Paper 8314, 129th Conv. Audio Eng. Soc., San Francisco, California, Nov. 4-7, 2010, nine pages.
Jost, A. et al. (Dec. 2000). "Transaural 3-D Audio With User-Controlle Calibration," Proceedings of the COST G-6 Conference on Digital Audio Effects (DAFX-00), Verona, Italy, Dec. 7-9, 2000, six pages.

Jot, J-M. (Oct. 2012). "Object-Based Audio Content Authoring and Distribution for Interactive and Linear Soundtracks," 133rd Conv. Audio Engineering Society, 12 pages.
Jot, J-M. et al. (May 2003). "Spatial Enhancement of Audio Recordings," AES 23rd International Conference, Copenhagen, Denmark, 2003 May 23-25, 2003, 11 pages.
Jot, J-M. et al. (Oct. 2007). "Spatial Audio Scene Coding in a Universal Two-Channel 3-D Stereo Format," Convention Paper 7276, Audio Engineering Society, 123rd Conv., New York, New York, Oct. 5-8, 2007, 15 pages.
Jot, J-M. (2000). "Proposal for 1A-SIG 3D Audio Rendering Guideline Level 3 (I3DL3)," IA-SIG 3D Audio Workgroup Meeting, Powerpoint presentation, 13 pages.
Jot, J-M. (Apr. 2012). "Enhancing the 3D TV Experience through Next-Generation 3D Audio Coding and Processing Technology," NAB Broadcast Engineering Conf. listing of presentations only, one page.
Jot, J-M. (Apr. 2017). "New Immersive and Object-Based Multichannel Audio Formats for Cinema, Entertainment and Cinematic VR," IEEE SPS Chapter Talk.
Jot, J-M. (Apr. 7, 2014). "Object-Based Immersive Audio for Next-Generation Boradcast," NAB Broadcast. Engineering Conf., 26 pages.
Jot, J-M. (Aug. 2018). "Unleashing Wearable 3D Audio," Audio Eng. Soc. Conference on Audio for Virtual and Augmented Reality, 37 pages.
Jot, J-M. (Dec. 2000). "Efficient Models for Interactive Environmental Audio Spatialization," DAFx International Conf. Digital Audio Effects, 22 pages.
Jot, J-M. (Dec. 2012). "Interactive 3D Audio Rendering in Flexible Playback Configurations," IEEE APSIPA Conf., nine pages.
Jot, J-M. (Feb. 2000). "Advanced Audio BIFS: Environmental Spatialization of Audio in MPEG-4, version 2," Audio Engineering Society, 108th Conv., Presentation, 17 pages.
Jot, J-M. (Feb. 2011). "Next-Generation 3-D Audio—Creation, Transmission and Reproduction," ATSC Symposium on Next Generation Broadcast Television, 20 pages.
Jot, J-M. (Feb. 2016). "Environmental Audio Effects in Games, VR and AR," Audio Eng. Soc., 61st Conf.—Audio for Games, Paragraph located on p. 7, and located at http://www.aes.org/conferences/61/schedule.cfm,last visited on Oct. 23, 2018, 10 pages.
Jot, J-M. (Feb. 2017). "Augmented Reality Headphone Reverberation," DSP Seminar at CCRMA, Stanford Univ, Palo Alto, CA., Abstract Only, one page.
Jot, J-M. (Jan. 1999) "Real-Time Spatial Processing of Sounds for Music, Multimedia and Interaction Human-Computer Interfaces," ACM Multimedia Systems, 7:55-69.
Jot, J-M. (Jan. 2008). "Prospects in Format-Agnostic Spatial Audio," 2nd International SpACE-Net Spatial Audio Workshop, list of presentations, 4 pages.
Jot, J-M. (Jun. 2018). "Towards 6-DoF XR Audio," Immersive Experience IX Symposium, 11 pages.
Jot, J-M. (Jun. 27, 2014). "Next-Generation Immersive Audio Content Standard and Consumer Format," IEEE International Symposium on Broadband Multimedia Systems and Broadcasting, 24 pages.
Jot, J-M. (Mar. 1992) "An Analysis/Synthesis Approach to Real-Time Artificial Reverberations," IEEE ICASSP International Conference on Acoustics, Speech and Signal Processing, San Francisco, CA, Mar. 23-26, 1992, pp. II-221-II-224.
Jot, J-M. (Mar. 2015). "DTS:X Next-Generation Consumer Audio Delivery Solution," AES 57th Conf. on the Future of Audio Entertainment Technology, 16 pages.
Jot, J-M. (Mar. 2015). "Integrating Object-, Scene-, and Channel-Based Immersive Audio for Delivery to the Home," AES 57th Conf. on the Future of Audio Entertainment Technology, presentation Workshop 2 p.m.., p. 5, 5 pages.
Jot, J-M. (May 2001), "Perceptual and Statistical Models for Virtual Environments," ACM Campfire: Acoustic Rendering for Virtual Environments, Preconference Proceedings, Snowbird, Utah, May 26-29, 2001, 10 pages.

(56) References Cited

OTHER PUBLICATIONS

Jot, J-M. (Nov. 18, 2013). "MDA—an Open Content Format for Next-Generation Immersive Audio," Forum International du Son Multicanal, 29 pages.
Jot, J-M. (Nov. 2012). "Multichannel 3D Audio Encoding and Reproduction," Forum International du Son Multicanal, 21 pages.
Jot, J-M. (Oct. 2007). "Efficient Description and Rendering of Complex Interactive Acoustic Scenes," Proc. of the 10th Int. Conference on Digital Audio Effects (DAFx-07), Bordeaux, France, Sep. 10-15, 2007, two pages.
Jot, J-M. (Oct. 2008). "Two-Channel Matrix Surround Encoding for Flexible Interactive 3-D Audio Reproduction," Convention Paper 7552, Audio Engineering Society, 125th Conv. San Francisco, California, Oct. 2-5, 2008, 13 pages.
Jot, J-M. (Oct. 2015). "Immersive Audio Processing and Effects for Games," 139th Conv. Audio Engineering Society, 25 pages.
Jot, J-M. (Oct. 2017). "Room-Adaptive Headphone 3D Audio," Audio Engineering Society, 143rd Conv.New York, New York, 23 pages.
Jot, J-M. (Oct. 9, 2013). "Object-Based Immersive Audio Content Format for Next-Generation Broadcast," IEEE Broadcast Symposium, 18 pages.
Jot, J-M. (Sep. 1997). "Efficient Models for Reverberation and Distance Rendering in Computer Music and Virtual Audio Reality," ICMC International Computer Music Conf., eight pages.
Jot, J-M. (Sep. 2017). "Efficient Reverberation Rendering for Complex Interactive Audio Scenes," DAFx 20th International Conf. Digital Audio Effects, 58 pages.
Jot, J-M. et al. (1995). "Le Spatialisateur," Grame Conf. "Le Son et L'Espace." French only, seven pages.
Jot, J-M. et al. (2006). "Spatialisateur—Introduction," IRCAM (1995, revised 2006.).
Jot, J-M. et al. (2012). "Spatialisateur—Introduction," IRCAM (1995, revised 2012.) Located at http://web4.ircam.fr/transmission.html?event=1021&L=1 . . . , last visited Oct. 23, 2018, two pages.
Jot, J-M. et al. (Feb. 1991). "Digital Delay Networks for Designing Artificial Reverberators," Audio Engineering Society, 90th Conv., Paris, France, Feb. 19-22, 1991, 17 pages.
Jot, J-M. et al. (Feb. 1995). "Digital Signal Processing Issues in the Context of Binaural and Transaural Stereophony," Audio Engineering Society, 98th Conv., Paris, France, Feb. 25-28, 1995, 47 pages.
Jot, J-M. et al. (Jun. 2016). "MDA—Open Standard for immersive Audio Content Creation and Distribution," Immersive Experience IX Symposium, 33 pages.
Jot, J-M. et al. (Mar. 1999). "A Comparative Study of 3-D Audio Encoding and Rendering Techniques," Audio Eng. Society, 16th International Conf., 20 pages.
Jot, J-M. et al. (May 1995). "Spat~: a Spatial Processor for Musicians and Sound Engineers," CIARM'95 Conference, Ferrara (Italy) 1995, six pages.
Jot, J-M. et al. (May 2006). "Scene Description Model and Rendering Engine for Interative Virtual Acoustics," Convention Paper 6660, Audio Engineering Society, 120th Conv., Paris, Francs, May 20-23, 2006, 13 pages.
Jot, J-M. et al. (May 2010). "Center-Channel Processing in Virtual 3-D," Convention Paper 8116, Audio Engineering Society, 128th Conv., London, UK, May 22-25, 2010, 10 pages.
Jot, J-M. et al. (Oct. 1993). "Biaural Concert Hall Simulation in Real Time," IEEE Workshop on Applications of Digital Signal Processing to Audio and Acoustics. Located at: http://architexte.ircam.fr/textes/Jot93a/index.html, last visited Oct. 15, 2018, 17 pages.
Jot, J-M. et al. (Oct. 2006). "Binaural Simulation of Complex Acoustic Scenes for Interactive Audio," Convention Paper 6950, Audio Engineering Society, 121st Conv., San Francisco, California, Oct. 5-8, 2006, 20 pages.
Jot, J-M. et al. (Oct. 2011). "Beyond Surround Sound—Creation, Coding and Reproduction of 3-D Audio Soundtracks," Convention Paper 8463, Audio Engineering Society, 131st. Conv., New York, New York, Oct. 20-23, 2011, 11 pages.

Jot, J-M. et al. (Oct. 2015). "Dialog Control and Enhancement in Object-Based Audio Systems," Convention Paper 9356, Audio Engineering Society, 139th Conv., New York, New York, Oct. 29-Nov. 1, 2015, seven pages.
Jot, J-M. et al. (Oct. 2016). "Augmented Reality Headphone Environment Rendering," Audio Eng. Soc. Conf. on Audio for Virtual and Augmented Reality, Los Angeles, California, Sep. 30-Oct. 1, 2016, six pages.
Jot, J-M. et al. (Oct. 2017). "Efficient Structures for Virtual Immersive Audio Processing," Convention paper 9865, Audio Engineering Society, 143rd Conv. Presented in New York, New York, Oct. 18-21, 2017, eight pages.
Jot, J-M. et al. (Sep. 1997). "Analysis and Synthesis of Room Reverberation Based on a Statistical Time-Frequency Model," Audio Engineering Society, 103rd Convention, 31 pages.
Jot, J-M. et al. (Sep. 1998). "Approaches to Binaural Synthesis," Audio Engineering Society, 105th Conv., San Francisco, California, Sep. 26-29, 1998, 14 pages.
Jot, J-M. et al. (Sep. 20, 1999). "Interactive 3-D Audio Rendering Guidelines Level 2.0," Interactive Audio Special Interest Group, 29 pages.
Larcher, V. et al. (Feb. 2000). "Study and Comparison of Efficient Methods for 3D Audio Spatialization Based on Linear Decomposition of HRTF Data," Audio Engineering Society, 108th Conv., Paris, France, Feb. 19-22, 2000; 30 pages.
Larcher, V. et al. (Sep. 1998). "Equalization Methods in Binaural Technology," Audio Engineering Society, 105th Conv. San Francisco, California, Sep. 26-29, 1998, 29 pages.
Larcher, V. et al. (Sep. 2001). "Individualization of HRTF by Spectral Warping," International Congress on Acoustics, 3 pages.
Laroche, J. et al. (Apr. 1992). "Anaiysis/Synthese of Quasi-Harmonic Sounds by Use of the Karpius-Strong Algorithm," 2nd French Congress on Acoustics, Journal de Physique IV, Colloque C1, Supplement au Journal de Physique III, 2:C1-117-C1-120 (five pages.).
Marin, M. et al. (May 1994). "Environment de Simulation pour l'Evaluation Psychoacoustique des Systemes de Prise et de Restitution du Son dans un Contexte de Teleconference," 3rd French Congress on Acoustics, five pages.
Merimaa, J. et al. (Oct. 2007). "Correlation-Based Ambience Extraction from Stereo Recordings," Convention Paper 7282. Audio Eng. Society, 123rd Conv., New York, New York, Oct. 5-8, 2007, 15 pages.
Murgai, P. et al. (Oct. 2017). "Blind Estimation of the Reverberation Fingerprint of Unknown Acoustic Environments," Convention Paper 9905, Audio Engineering Society, 143rd Conv. New York, New York, Oct. 18-21, 2017, six pages.
Non-Final Office Action dated Apr. 2, 2020, for U.S. Appl. No. 16/803,301, filed Feb. 27, 2020, seven pages.
Non-Final Office Action dated Aug. 7, 2019, for U.S. Appl. No. 16/163,529, filed Oct. 17, 2018, 12 pages.
Non-Final Office Action dated Feb. 16, 2022, for U.S. Appl. No. 16/970,331, filed Aug. 14, 2020, eleven pages.
Non-Final Office Action dated Jun. 14, 2021, for U.S. Appl. No. 16/970,331, filed Aug. 14, 2020, nine pages.
Notice of Allowance dated Feb. 7, 2022, for U.S. Appl. No. 17/079,212, filed Oct. 23, 2020, 5 pages.
Notice of Allowance dated May 4, 2020, for U.S. Appl. No. 16/803,301, filed Feb. 27, 2020, five pages.
Notice of Allowance dated Nov. 27, 2019, for U.S. Appl. No. 16/163,529, filed Oct. 17, 2018, 9 pages.
Pernaux, J-M. et al. (Nov. 1998). "Virtual Sound Source Positioning and Mixing in 5.1 Implementation on the Real-Time System Genesis," DAFx International Conf. Digital Audio Effects, five pages.
Ravish, Mehra et al: "WAVE: Interactive Wave-based Sound Propagation for Virtual Environments," IEEE Transactions on Visualization and Computer Graphics, IEEE Service Center, Los Alamitos, CA, US, vol. 21, No. 4, Apr. 18, 2015 (Apr. 18, 2015), pp. 434-442, retrieved on Mar. 20, 2015.
Savioja, L. et al.: "Creating interactive virtual acoustic environments," Journal of the audio engineering society, audio engineering

(56) References Cited

OTHER PUBLICATIONS society, New York, NY, US, vol. 47, No. 9, Sep. 1, 1999 (Sep. 1, 1999), pp. 675-705, XP000927390, ISSN: 1549-4950, Chapters 2, 4; p. 691-p. 692; figure 19 *.

Thompson, J. et al. (Oct. 2012). "Direct-Diffuse Decomposition of Multichannel Signals Using a System of Pairwise Correlations," Convention Paper 8807, Audio Engineering Society, 133rd Conv. San Francisco, California, Oct. 26-29, 2012, 15 pages.

Trivi, J-M. et al. (Aug. 2002). "Rendering MPEG-4 AABIFS Content Through a Low-Level Cross-Platform 3D Audio API," IEEE ICME International Conf. Multimedia & Expo., pp. 513-516.

Walker, Robert : "A Simple Acoustic Room Model For Virtual Production," Internet Citation, Jun. 7, 1999 (Jun. 7, 1999), pp. 48-72, Retrieved from the Internet: URL:http://www.aes.org/tmpFiles/elib/20100211/7978.pdf, on Feb. 11, 2010, 30 pages.

Walsh, M. et al. (May 2011). "Adaptive Dynamics Enhancement," Convention Paper 8343, Audio Engineering Society, 130th Conv., London, UK May 13-16, 2011, 10 pages.

Walsh, M. et al. (Oct. 2006). "Loudspeaker-Based 3-D Audio System Design Using the M-S Shuffler Matrix," Convention Ppaer 6949, Audio Engineering Society, 121st. Conv., San Francisco, California, Oct. 5-8, 2006, 17 pages.

* cited by examiner

REVERBERATION FINGERPRINT ESTIMATION

CROSS REFERENCE TO RELATED APPLICATIONS

This Application is a continuation of U.S. application Ser. No. 17/079,212, filed on Oct. 23, 2020, which claims the benefit of U.S. Provisional Application No. 62/926,330, filed on Oct. 25, 2019, the entire disclosures of which are herein incorporated by reference for all purposes.

FIELD

This disclosure relates in general to systems and methods for determining and processing audio information, and in particular to systems and methods for determining and processing audio information in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

It can be desirable for MR systems to interface with as many human senses as possible to create an immersive mixed reality environment for a user. Visual displays of virtual content can be important to a mixed reality experience, but audio signals can also be valuable in creating immersion in the mixed reality environment. Similar to visually displayed virtual content, virtual audio content can also be adapted to simulate sounds from a real environment. For example, virtual audio content presented in a real environment with echoes may also be rendered as echoing, even though the virtual audio content may not actually be echoing in the real environment. This adaptation can help blend virtual content with real content such that a distinction between the two is not obvious or even imperceptible to an end-user. To effectively blend virtual audio content with real audio content, it can be desirable to understand acoustic properties of the real environment so that virtual audio content can simulate the characteristics of real audio content.

BRIEF SUMMARY

Examples of the disclosure describe systems and methods for estimating acoustic properties of an environment. In an example method, a first audio signal is received via a microphone of a wearable head device. An envelope of the first audio signal is determined, and a first reverberation time is estimated based on the envelope of the first audio signal. A difference between the first reverberation time and a second reverberation time is determined. A change in the environment is determined based on the difference between the first reverberation time and the second reverberation time. A second audio signal is presented via a speaker of a wearable head device, wherein the second audio signal is based on the second reverberation time.

DETAILED DESCRIPTION

Figure 1A:
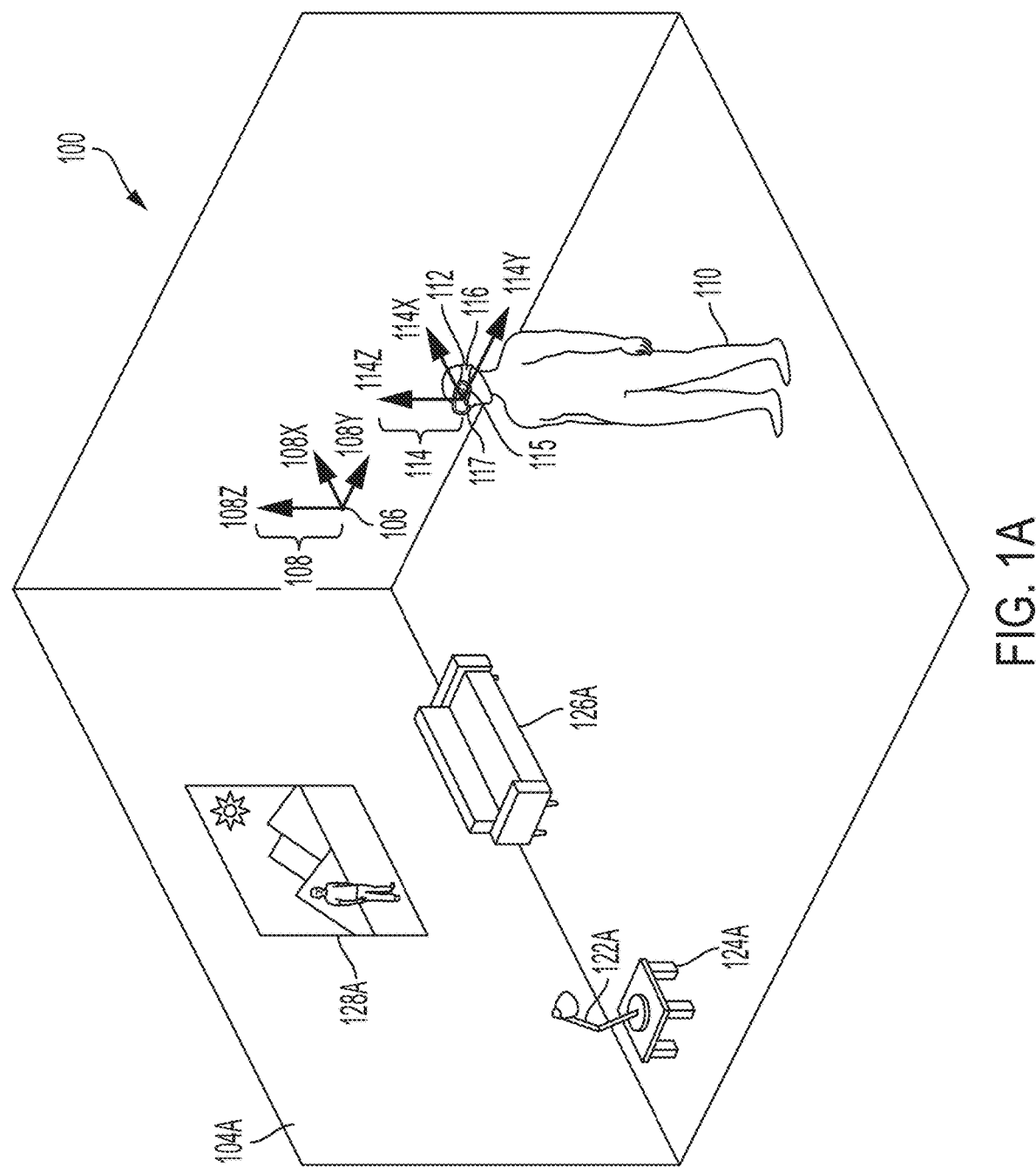
FIGS. 1A-1C illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
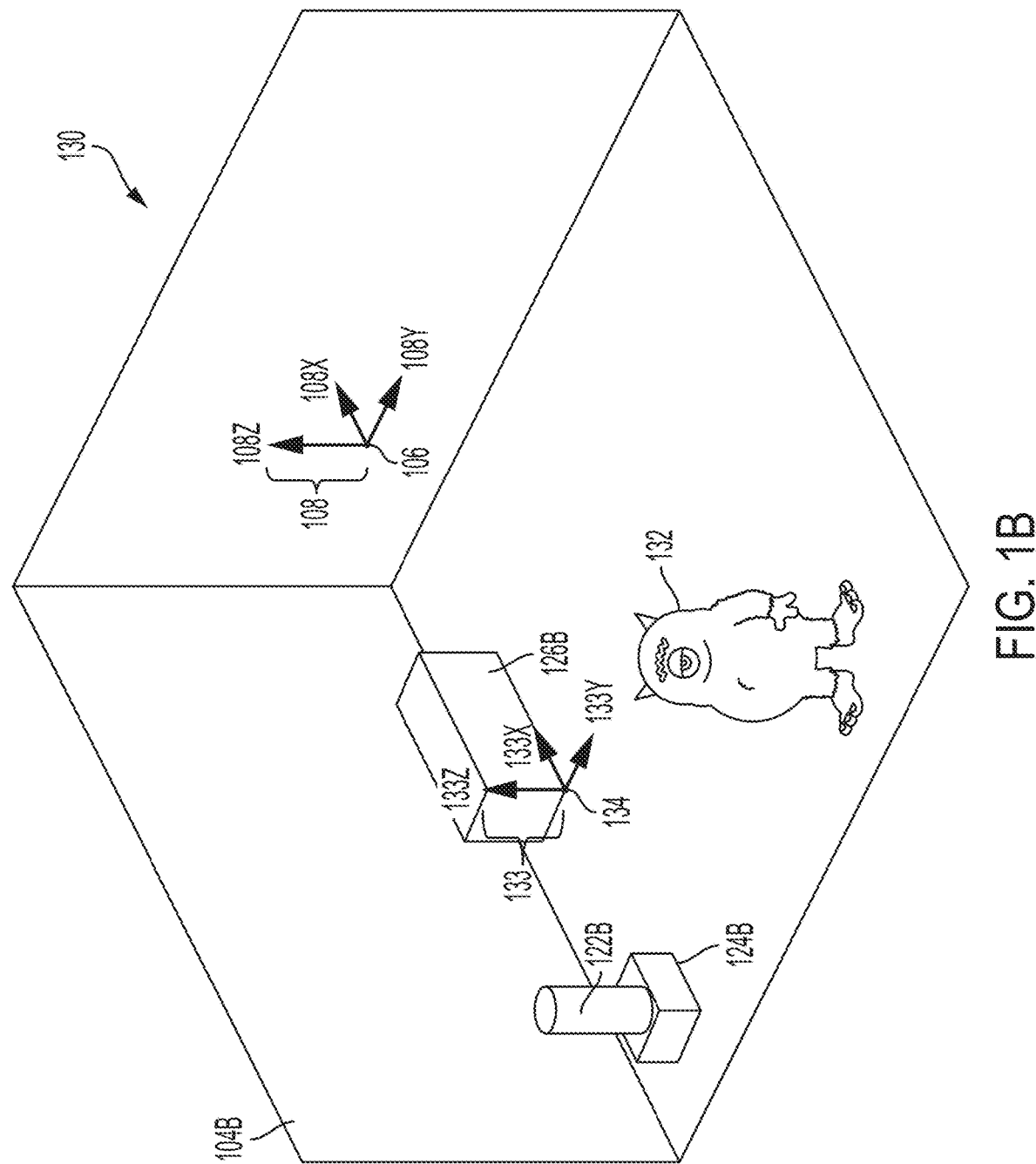

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
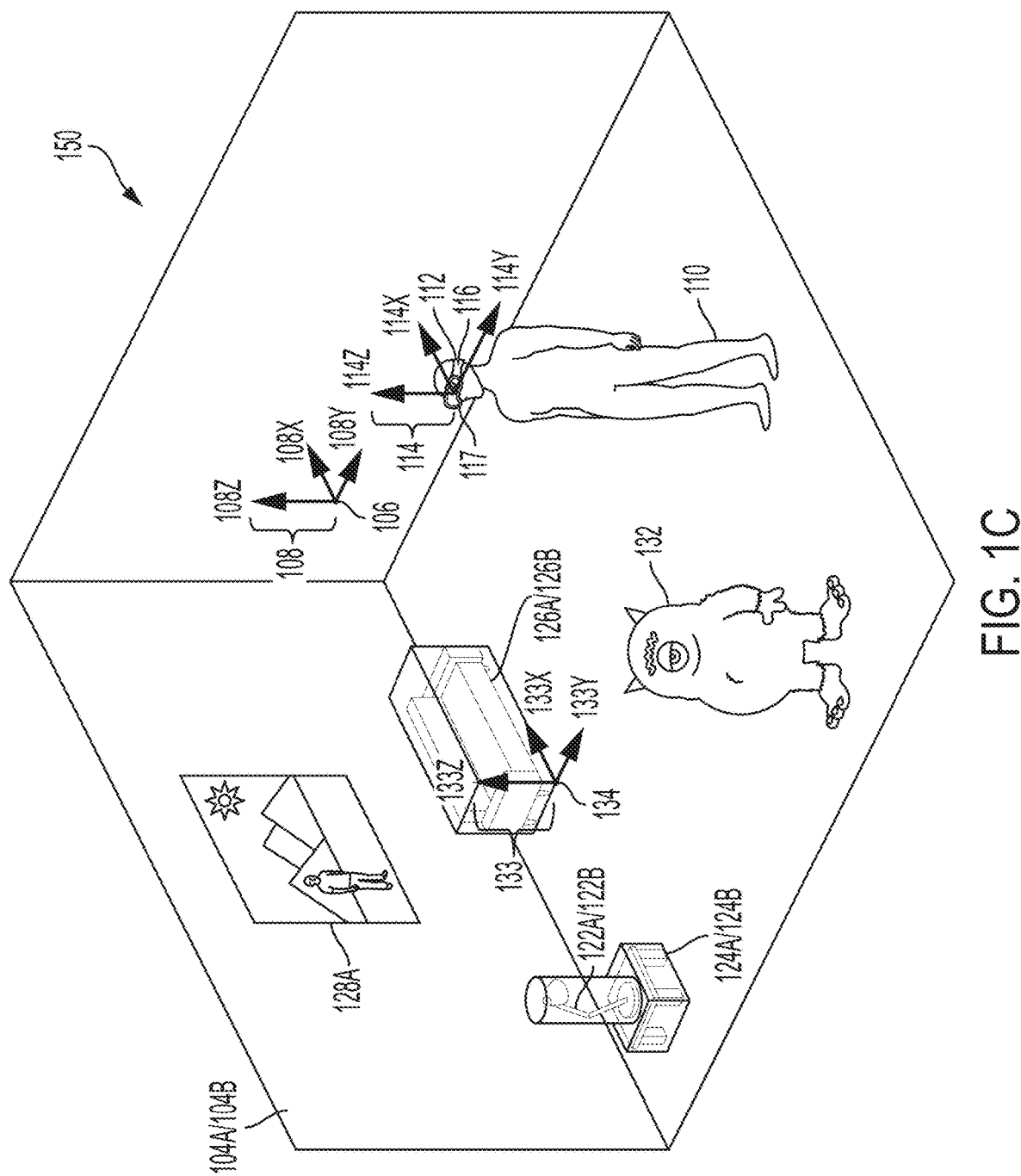

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
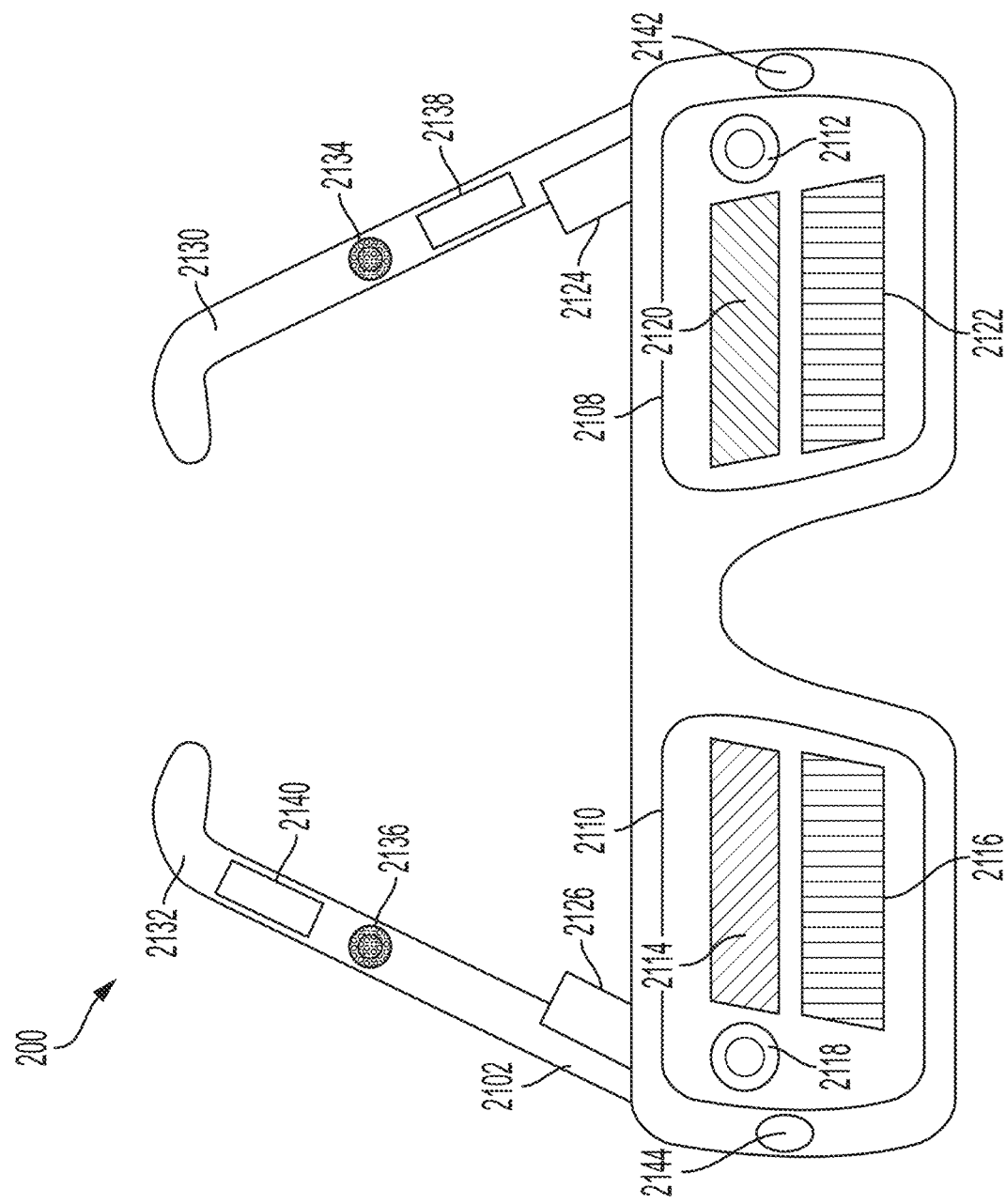
FIGS. 2A-2D illustrate components of an example mixed reality system that can be used to generate and interact with a mixed reality environment, according to one or more embodiments of the disclosure.
Figure 2B:
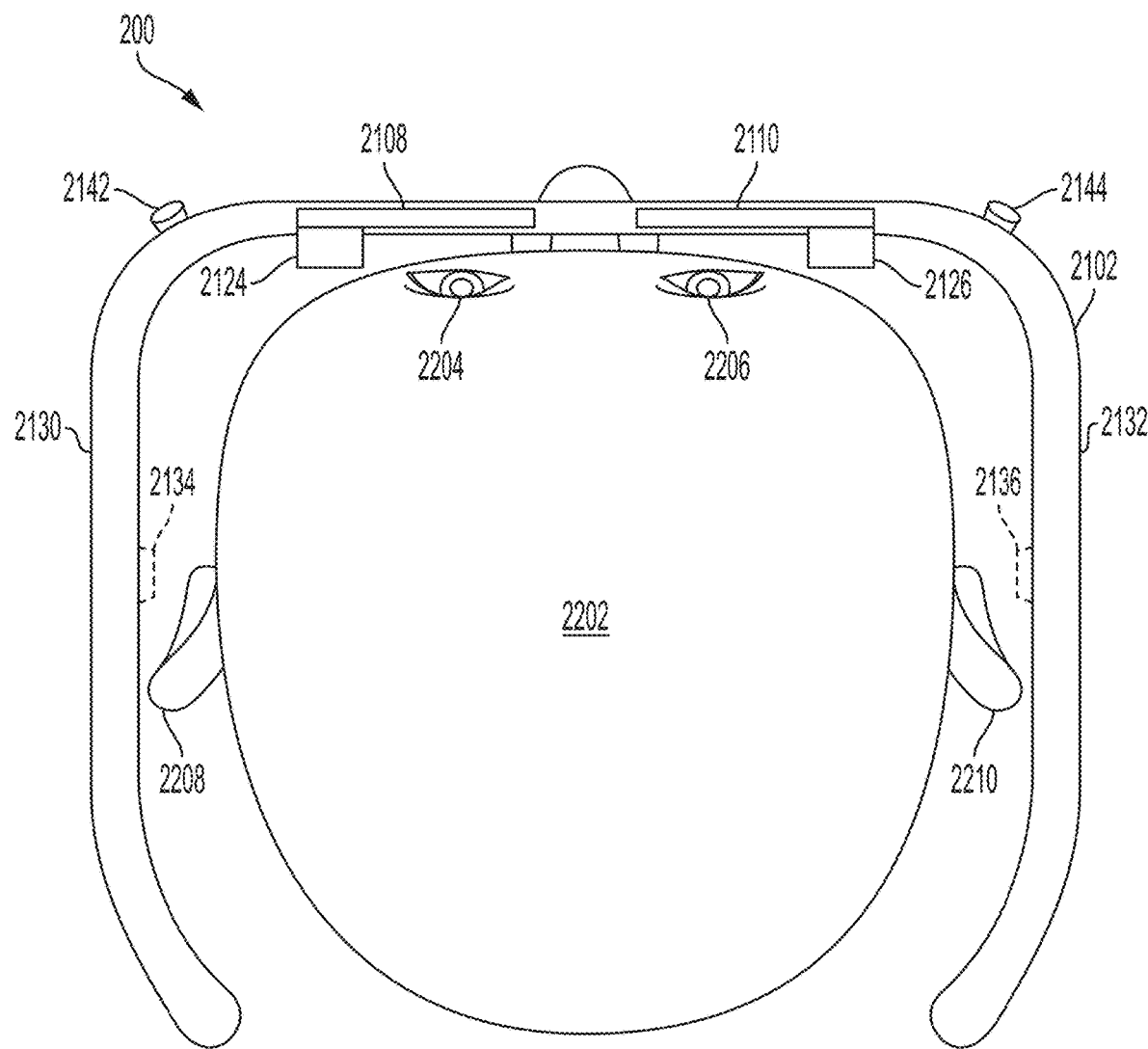
Figure 2C:
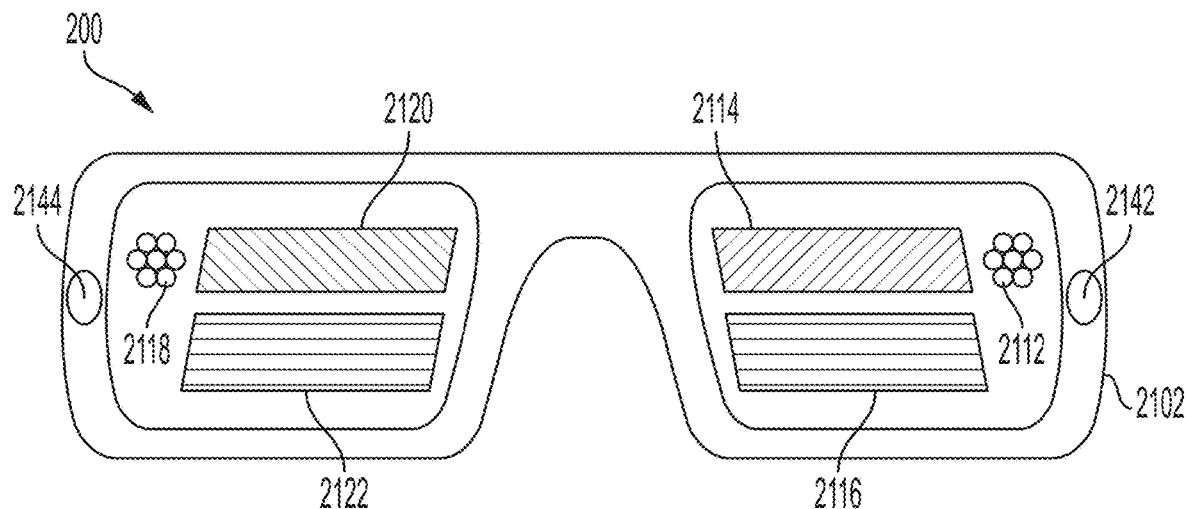
Figure 2D:
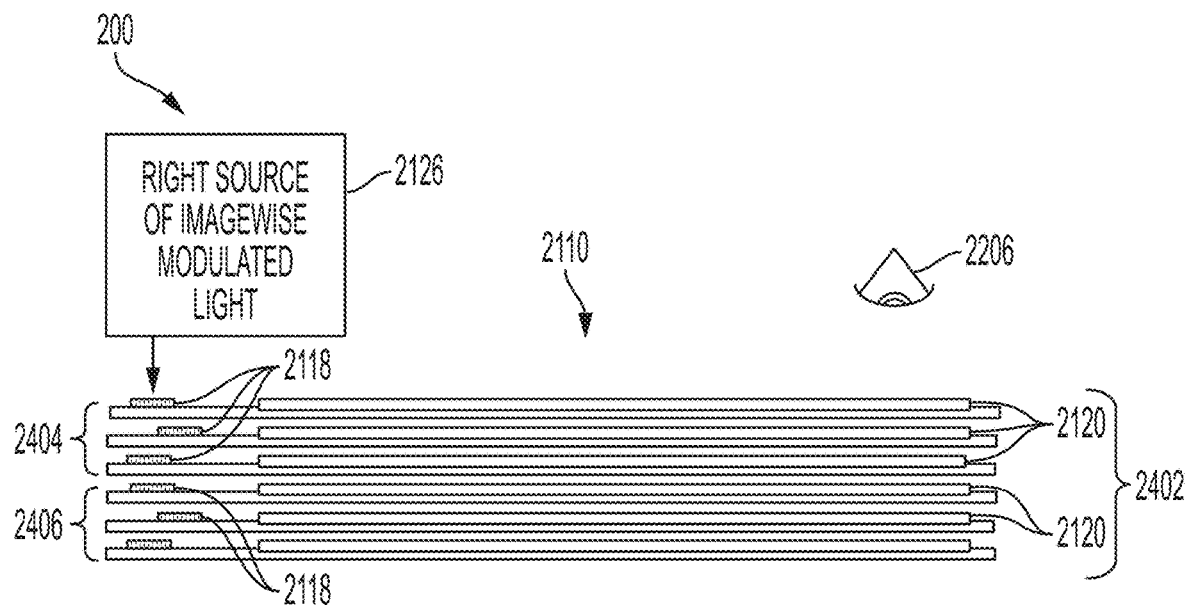

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
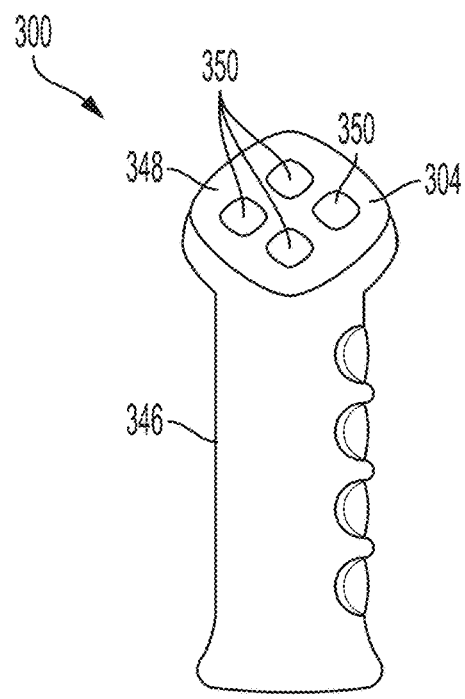
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
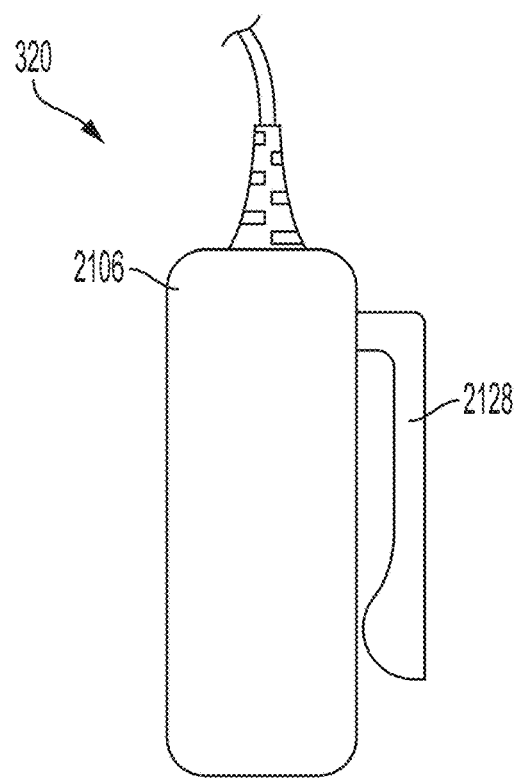
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
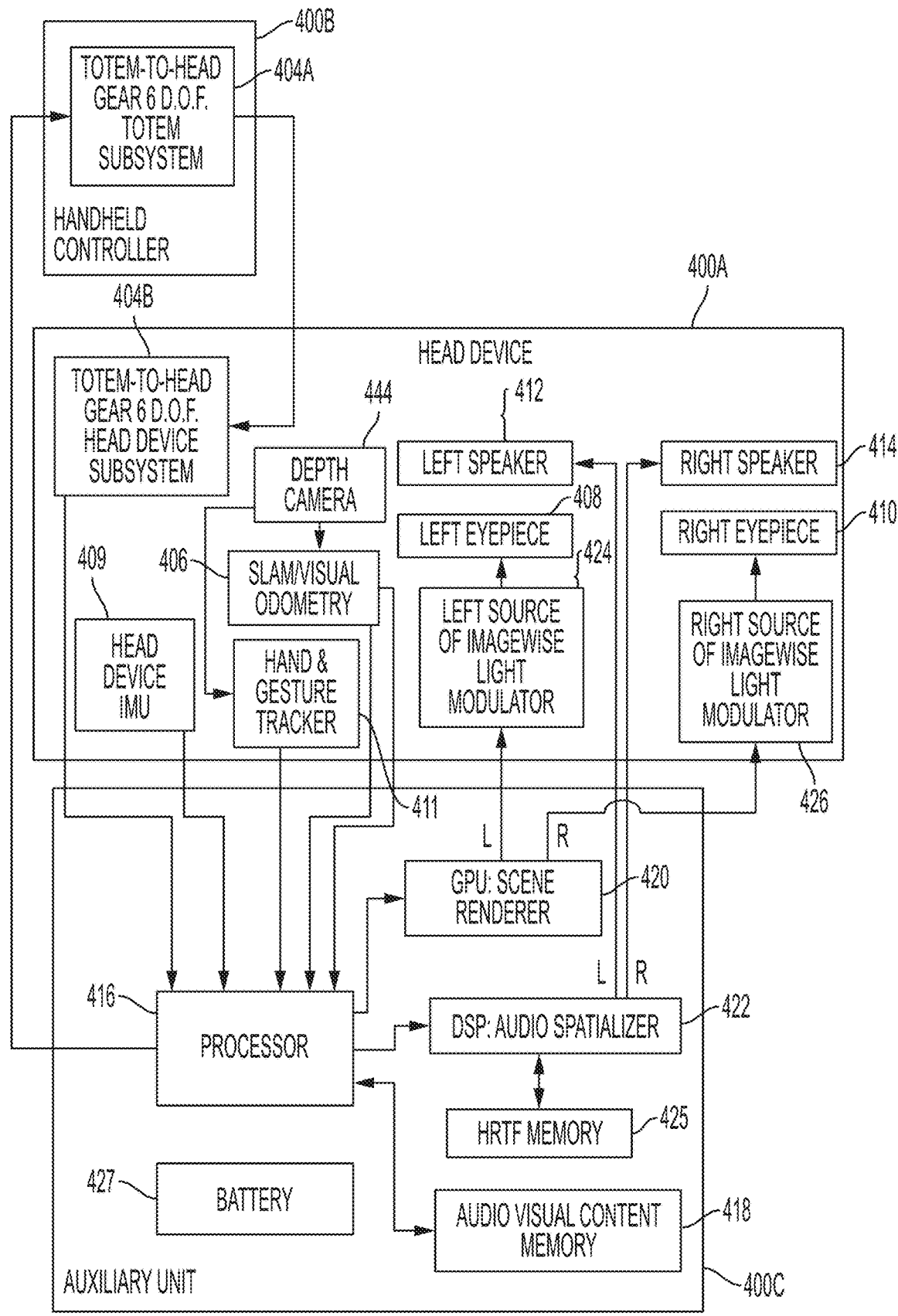
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Reverberation Fingerprint Estimation

Presenting virtual audio content to a user can be advantageous in creating an immersive augmented/mixed reality experience. An immersive augmented/mixed reality experience can further blend real content with virtual content when convincing audio is presented in addition to convincing video. Displaying convincing virtual video content (e.g., aligned with and/or inseparable from real content) can include mapping a real, and sometimes unknown, environment while simultaneously estimating a MR system's location and orientation within the real environment to accurately display virtual video content within the real environment. Displaying convincing virtual video content can further include rendering two sets of the same virtual video content from two different perspectives so that a stereoscopic image can be presented to a user to simulate three-dimensional virtual video content. Similar to displaying convincing virtual video content, presenting virtual audio content in a convincing matter can also include complex analyses of a real environment. For example, it can be desirable to understand acoustic properties of a real environment in which a MR system is being used so that virtual audio content can be rendered in a way that it simulates real audio content. Acoustic properties of a real environment can be used by a MR system (e.g., MR system 112, 200) to modify a rendering algorithm such that the virtual audio content sounds as if it originated from or otherwise belongs in the real environment. For example, a MR system used in a room with hard flooring and exposed walls may produce virtual audio content that mimics an echo that real audio content may have. Playing virtual audio content in a static manner as a user changes real environments (which may have different acoustic properties) may detract from an experience's immersion. It can be especially beneficial to render virtual audio content to mimic characteristics of real audio content if real audio content and virtual audio content may interact with each other (e.g., a user can speak to a virtual companion, and the virtual companion may speak back to the user). To do so, a MR system may determine acoustic characteristics of the real environment and apply those acoustic characteristics to virtual audio content (e.g., by altering a rendering algorithm for the virtual audio content). Additional details may be found in U.S. patent application Ser. No. 16/163,529, the contents of which are hereby incorporated in their entirety.

One parameter that may characterize a real environment's acoustic properties can be a reverberation time (e.g., a T60 time). A reverberation time can include a length of time required for a sound to decay by a certain amount (e.g., by 60 decibels). Sound decay can be a result of sound reflecting off surfaces in a real environment (e.g., walls, floors, furniture, etc.) whilst losing energy due to, for example, geometric spreading. A reverberation time can be influenced by environmental factors. For example, absorbent surfaces (e.g., cushions) may absorb sound in addition to geometric spreading, and a reverberation time may be reduced as a result. In some embodiments, it may not be necessary to have information about an original source to estimate an environment's reverberation time.

Another parameter that may characterize a real environment's acoustic properties can be a reverberation gain. A reverberation gain can include a ratio of a sound's direct/source/original energy to the sound's reverberation energy (e.g., energy of a reverberation resulting from the direct/source/original sound) where a listener and the source are substantially co-located (e.g., a user may clap their hands, producing a source sound that may be considered substantially co-located with one or more microphones mounted on a head-wearable MR system). For example, an impulse (e.g., a clap) may have an energy associated with the impulse, and the reverberation sound from the impulse may have an energy associated with the reverberation of the impulse. The ratio of the original/source energy to the reverberation energy may be a reverberation gain. A real environment's reverberation gain may be influenced by, for example, absorbent surfaces that can absorb sound and thereby reduce a reverberation energy.

The reverberation time and the reverberation gain can collectively be referred to as a reverberation fingerprint. In some embodiments, a reverberation fingerprint can be passed to an audio rendering algorithm as one or more input parameters, which may allow the audio rendering algorithm to present virtual audio content with the same or similar characteristics as real audio content in a real environment.

A reverberation fingerprint can be useful because it may characterize a real environment's acoustic properties independent of a sound source's position and/or orientation in the real environment. For example, a standard interior room with four walls, a floor, and a ceiling may exhibit the same (or substantially the same) reverberation time and/or reverberation gain regardless if a source is located at a corner of the room, in the center of the room, or along any of the room's walls/edges. As another example, a sound source directly facing a corner of the room, the center of the room, or a wall in the room may all behave the same (or substantially the same) according to a real environment's reverberation fingerprint. A reverberation fingerprint can also be useful because it may characterize a real environment's acoustic properties independent of characteristics of a sound source. For example, a sound source (e.g., a person talking) at a low frequency, middle frequency, or high frequency may all behave the same (or substantially the same) according to a real environment's reverberation time and/or reverberation gain. Similarly, an impulse sound source (e.g., a clap) and a non-impulse sound source may behave the same (or substantially the same) according to a real environment's reverberation fingerprint (e.g., reverberation time and/or reverberation gain). As another example, a loud sound source and a quiet sound source (e.g., in terms of amplitude) may behave the same (or substantially the same) according to a real environment's reverberation fingerprint (e.g., reverberation time and/or reverberation gain). The independence of a reverberation fingerprint from characteristics and/or location of a sound source can make the reverberation fingerprint a useful tool to render virtual audio content in a computationally efficient manner (e.g., the rendering algorithm can be the same as long as a user does not change environments, for example, by moving to a different room). In some embodiments, a reverberation fingerprint may apply to "well-behaved" rooms (e.g., a standard interior room with four walls, a floor, and a ceiling), and may not apply to "misbehaved" rooms (e.g., a long corridor) that may have special acoustic properties.

In some embodiments, it can be desirable to perform a "blind" estimation of a real environment's reverberation fingerprint. A blind estimation can be an estimation of a reverberation fingerprint where information about a sound source may not be required. For example, a reverberation fingerprint may be estimated based simply on human conversation, where information on the original speech may not be provided to the estimation algorithm. Pauses during human speech can provide enough time for a reverberation fingerprint to be estimated using blind estimation. It can be beneficial to perform a blind estimation because such an estimation can be done without requiring a lengthy setup process and/or user interaction. In some embodiments, a reverberation time can be blindly estimated and may not require information about an original sound source. In some embodiments, a blind estimation may not be performed on a reverberation gain, which may include information about an original sound source.

Figure 5:
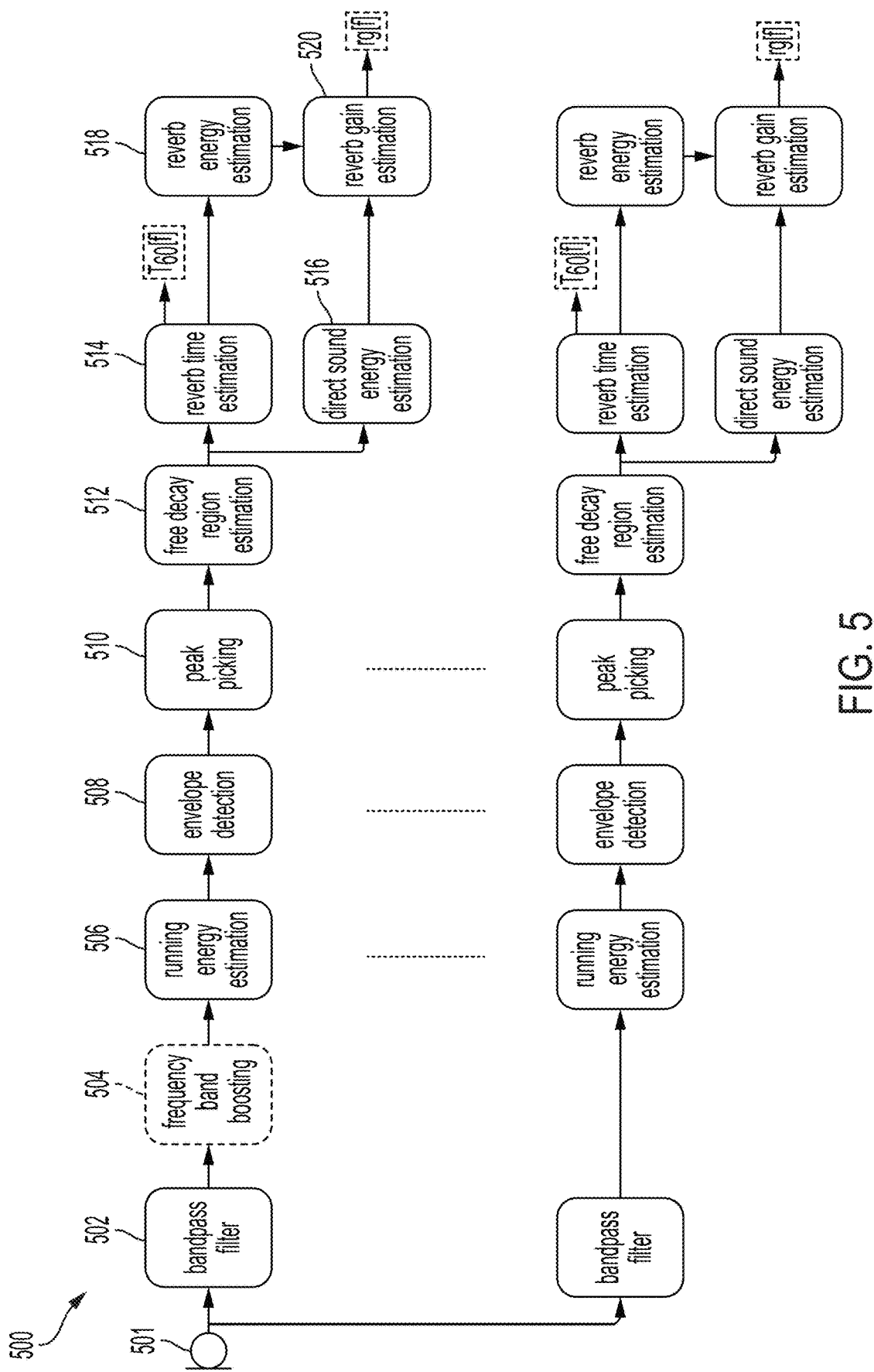
FIG. 5 illustrates an example of estimating a reverberation fingerprint, according to one or more embodiments of the disclosure.

FIG. 5 illustrates an example process 500 of estimating a reverberation fingerprint, according to some embodiments. The example process shown can be implemented using one or more components of a mixed reality system, such as one or more of wearable head device 2102, handheld controller 300, and auxiliary unit 320 of the example mixed reality system 200 described above; or by a system (e.g., a system comprising a cloud server) in communication with mixed reality system 200. At step 502 of process 500, an input 501 can be split into one or more filtered components, which may then be individually processed. For example, at step 502, a bandpass filter can be applied to an input 501, which can be an audio signal from one or more microphones (e.g., one or more microphones mounted on a MR system). A bandpass filter can preferentially allow certain frequency ranges through the filter and/or suppress frequencies outside the frequency range. Bandpass filters can break a signal into smaller component pieces that may be easier to process for computational efficiency. Bandpass filters can also improve a signal-to-noise ratio of a signal by removing unwanted noise at frequencies outside the frequency range. In some embodiments, bandpass filters can be used to separate an audio signal into six frequency ranges. A reverberation fingerprint (e.g., a reverberation time and a reverberation gain) can be estimated for each frequency range. This can be used to create a continuous frequency response curve such that each frequency can have an associated reverberation time and/or reverberation gain (e.g., a reverberation time and/or reverberation gain may be interpolated from calculated values that may be centered at a frequency range separated by a bandpass filter). Although six frequency ranges are discussed, an audio signal may be separated into any number of frequency ranges (e.g., using any number of bandpass filters). In some embodiments, octave filters can be applied to the input signal. In some embodiments, ⅓ octave filters can be applied to the input signal. In some embodiments, signals with frequencies that are too low (e.g., less than 100 Hz) may not be analyzed for a reverberation fingerprint (e.g., because low frequencies may not sufficiently reverberate to conduct a reverberation fingerprint analysis).

At step 504, frequency band boosting can optionally be applied. Frequency band boosting may be applied to low frequencies (e.g., less than 500 Hz) that may have a low signal-to-noise ratio, but the signal-to-noise ratio may still be sufficiently high to determine a reverberation fingerprint (e.g., the signal-to-noise ratio may be higher than a signal-to-noise ratio for frequencies less than 100 Hz). Frequency band boosting may be applied to other frequency bands, or not at all.

At step 506, a running energy estimation can be performed on a signal. A running energy estimation can be performed in the frequency domain, time domain, spectral domain, and/or any other suitable domain. Signal energy may be estimated by determining an area under a squared magnitude of the signal in a time domain or by using other appropriate methods.

At step 508, envelope detection can be run on the signal and may be based on a running energy (estimate) of the signal. A signal envelope can be a characterization of signal peaks and/or troughs and may define upper and/or lower boundaries of a signal (e.g., an oscillating signal). Envelope detection can be performed using a Hilbert transform, a leaky integrator based root mean square detector, and/or other suitable methods.

At step 510, peak picking can be run on a signal envelope. Peak picking can identify local peaks in a signal envelope based on an amplitude of a previously detected peak and/or based on local maxima.

At step 512, a free decay region estimation can be run on a signal envelope. A free decay region can be a region of a signal envelope where the envelope decreases (e.g., after a local peak). This can be the result of a reverberation where new sound may not be detected and only previous sound continues to reverberate in a real environment, resulting in a decrease in the signal envelope. At step 512, a linear fit can be determined for each of one or more free decay regions in a signal. A linear fit may be appropriate where a signal envelope is measured on a decibel scale due to an exponential decay of sound energy, and a decibel scale measuring on a logarithmic scale.

At step 514, a reverberation time can be estimated. A reverberation time may be estimated based on a free decay region or a portion of a free decay region with the fastest decaying slope, which can be determined from a linear fit determined for each free decay region (or portion of a free decay region). In some embodiments, a threshold amount of time (e.g., 50 ms) after a local peak may be ignored in determining a linear fit. This can be beneficial to avoid short-term reverberations (which may behave differently) and/or to help ensure the regression is fit to exclusively reverberant sound and not source sound. A linearly fitted slope can represent an amount by which the signal envelope decreases in decibels per unit of time (e.g., per second).

In some embodiments, multiple linear fits can be applied to a single free decay region. For example, a linear regression may only be applied within a time range that the regression is sufficiently accurate (e.g., a correlation of 97% or greater). If a linear regression no longer fits the remainder of the duration of a free decay region, one or more additional/alternate linear regressions may be applied. Accuracy in a reverberation time estimate can be increased by using only the fastest decaying slope within a free decay region because the associated portion of the free decay region may most accurately represent only reverberant sounds. For example, a portion of a free decay region with a slower decaying slope may capture a small amount of non-reverberant (e.g., original/source) sound, which may artificially slow a measured decay rate. Based on the fastest decaying linearly fitted slope, a reverberation time (which can be a time required for a signal to decay by 60 decibels) can be extrapolated.

Figure 6:
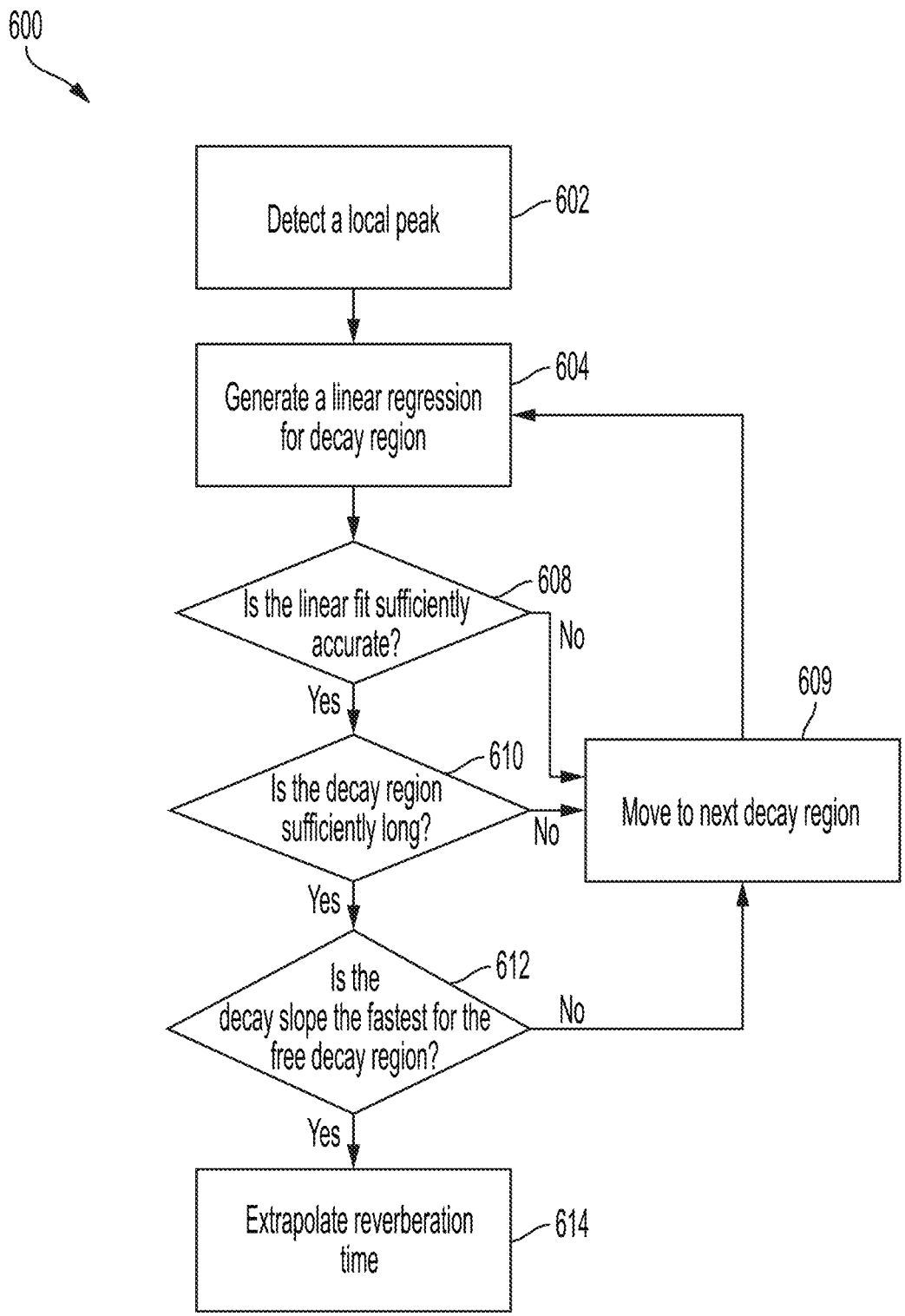
FIG. 6 illustrates an example of estimating a reverberation time, according to one or more embodiments of the disclosure.

FIG. 6 illustrates an example process 600 for estimating a reverberation time. Example process 600 may correspond to step 514 of example process 500 described above. Example process 600 can be implemented using one or more components of a mixed reality system, such as one or more of wearable head device 2102, handheld controller 300, and auxiliary unit 320 of the example mixed reality system 200 described above; or by a system (e.g., a system comprising a cloud server) in communication with mixed reality system 200. At step 602 of example process 600, a local peak may be determined (e.g., a local peak from a signal envelope). At step 604, a linear regression can be fit to part or all of a free decay region. A free decay region can be a region of a signal envelope where the envelope decreases (e.g., after a local peak). In some embodiments, a linear regression may not account for a portion of time after a local peak (e.g., 50 ms after a local peak). At step 608, it can be determined whether the linear fit is sufficiently accurate (e.g., has a sufficiently low root mean square error). If it is determined that the linear fit is not sufficiently accurate, at step 609 the next free decay region or portion of a free decay region may be examined. If it is determined that the linear fit is sufficiently accurate, at step 610 it can be determined if the decay region occurs over a sufficiently long period of time (e.g., >400 ms). If it is determined that the decay region does not occur over a sufficiently long period of time, the next free decay region or portion of a free decay region may be examined at step 609. If it is determined that the decay region does occur over a sufficiently long period of time, at step 612 it can be determined if the decay slope from the linear regression is the fastest decay slope for the entire free decay region. If it is determined that the decay slope is not the fastest decay slope for the entire free decay region, the next free decay region or portion of a free decay region can be examined at step 609. If it is determined that the decay slope is the fastest decay slope for the entire free decay region, a reverberation time can be extrapolated based on the fastest decay slope at step 614.

In some embodiments, a reverberation time can be estimated using converging (or approximately converging) measurements. For example, a reverberation time can be declared after a threshold number of consecutive free decay regions have decay slopes within a threshold value of each other. An average decay slope may then be determined and declared as a reverberation time. In some embodiments, decay slopes associated with free decay regions can be weighted according to a quality estimate for each measured decay slope. In some embodiments, a decay slope may be determined to be more accurate when an associated portion of a free decay region lasts for a threshold amount of time (e.g., 400 ms), which can increase an accuracy of the decay slope estimation. In some embodiments, a decay slope may be determined to be more accurate if it has a relatively accurate linear fit (e.g., a low root mean square error). Decay slopes that are more accurate can be assigned higher weights in a weighted average to determine a reverberation time. In some embodiments, a single decay slope that is determined to be the most accurate (e.g., based on decay length and/or linear fit accuracy) can be used to determine a reverberation time, which may be a reverberation time for a given frequency range (e.g., a frequency range selected by a bandpass filter at step 502).

Referring back to FIG. 5 and process 500, at step 514, a confidence value may be determined and associated with a reverberation time. A confidence value may be determined based on various factors. For example, a confidence value can be based on a number of convergent decay slopes, a linear fit accuracy of utilized decay slopes, a decay length of utilized decay slopes, a difference between the new reverberation time estimate and a previous reverberation time estimate, or any combination of these and/or other factors. In some embodiments, a reverberation time estimate with an associated confidence may not be declared if the confidence value is below a threshold value (e.g., because insufficient free decay regions were detected for convergence). If a reverberation time estimate is not declared, other reverberation time estimates for other frequency ranges (e.g., frequency ranges separated at step 502 using a bandpass filter) may still be declared (e.g., if those reverberation time estimates have sufficiently high confidence values). The reverberation time estimate for a missing frequency range may be interpolated from declared reverberation times at other frequency ranges.

At step 516, a direct sound energy estimation can be performed. A direct sound energy estimation may utilize information on the direct/source sound. For example, if a direct/source sound is known, a direct sound energy estimation can estimate the energy of the direct/source sound (e.g., by integrating an area under a signal envelope peak including the direct/source sound). This can be achieved by using impulse sounds, which may be easier to separate a direct/source sound from a reverberant sound. In some embodiments, a user may be prompted (e.g., by a MR system) to clap their hands to produce an impulse sound. In some embodiments, a speaker, for example one that is mounted on an MR system, may play an impulse sound. In some embodiments, an impulse sound can be used to estimate both a direct sound energy and a reverberation time estimate. In some embodiments, a direct sound estimation can be blindly estimated (e.g., if a blind estimate can separate a direct/source sound from a reverberant sound without prior knowledge of the direct/source sound).

At step 518, a reverberation sound energy can be estimated. The reverberation sound energy can be estimated by integrating a signal envelope from an end of a direct/source sound until the reverberant sound is no longer detected and/or the reverberant sound falls below a certain gain threshold (e.g., −90 dB).

At step 520, a reverberation gain can be estimated based on the direct sound energy estimation and the reverberation energy estimation. In some embodiments, the reverberation gain is calculated by taking a ratio of the reverberation energy to the direct sound energy. In some embodiments, the reverberation gain is calculated by taking a ratio of the direct sound energy to the reverberation energy. A reverberation gain estimate can be declared (e.g., passed to an audio rendering algorithm). In some embodiments, a confidence level may be associated with a reverberation gain estimate. For example, if a peak is detected in a reverberation energy estimation, it may indicate that new direct/source sound was introduced, and the reverberation gain estimate may no longer be accurate. In some embodiments, a reverberation gain estimate may only be declared if a confidence level is at or above a certain threshold.

In addition to using a reverberation fingerprint to more realistically render virtual audio content, a reverberation fingerprint can also be used to identify a real environment and/or identify a change in a real environment. For example, a user may calibrate a MR system in a first room (e.g., a first acoustic environment) and then move to a second room. The second room may have different acoustic properties than the first room (e.g., a different reverberation time and/or a different reverberation gain). A MR system may blindly estimate a reverberation time in the second room, determine that the reverberation time is sufficiently different than a previously declared reverberation time, and conclude that the user has changed rooms. A MR system may then declare a new reverberation time and/or a new reverberation gain (e.g., by asking the user to clap again, by playing an impulse through an external speaker, and/or doing a blind estimate of the reverberation gain). As another example, a user may calibrate a MR system in a room, and the MR system may determine a reverberation fingerprint of the room. The MR system may then identify the room based on the reverberation fingerprint and/or other factors (e.g., location determined through GPS and/or WiFi networks, or via one or more sensors such as described above with respect to the example mixed reality system 200). The MR system may access a remote database of previously mapped rooms and, using the reverberation fingerprint and/or other factors, identify the room as previously mapped. The MR system may download assets related to the room (e.g., a previously generated three-dimensional map of the room).

Figure 7:
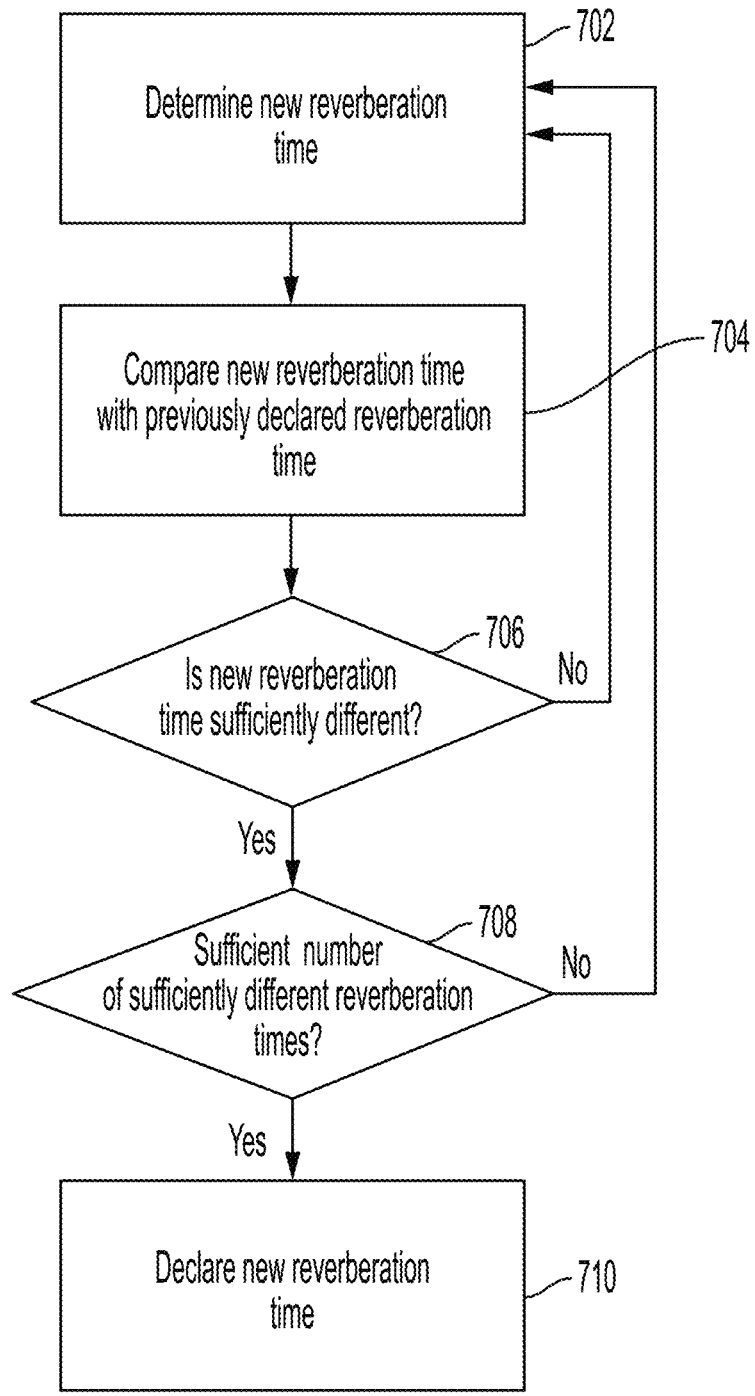
FIG. 7 illustrates an example of estimating a reverberation time, according to one or more embodiments of the disclosure.

FIG. 7 illustrates an example process for identifying a change in acoustic properties of a real environment. The example process shown can be implemented using one or more components of a mixed reality system, such as one or more of wearable head device 2102, handheld controller 300, and auxiliary unit 320 of the example mixed reality system 200 described above; or by a system (e.g., a system comprising a cloud server) in communication with mixed reality system 200. At step 702 of the example process, a new reverberation time can be determined (e.g., using process 500 and/or process 600). At step 704, the new reverberation time can be compared to a previously declared reverberation time. At step 706, it can be determined if the new reverberation time is sufficiently different than the previously declared reverberation time. The difference can be evaluated in any number of ways. For example, a difference may be sufficient if a new reverberation time for a frequency range has a difference from a declared reverberation time for the frequency range greater than a specified threshold (e.g., 10%, which may be a sufficient difference for human listeners to perceive a difference). As another example, a sufficient difference may be determined if a threshold number of reverberation times for given frequency ranges differs from a threshold number of declared reverberation times for those frequency ranges. As another example, an absolute value of a difference between a new frequency response curve (which can include interpolated points between declared reverberation times for tested frequency ranges) and a declared frequency response curve can be integrated. If the integrated area is above a certain threshold, it may be determined that the new reverberation times are sufficiently different from the declared reverberation times.

If the new reverberation time is determined to be insufficiently different from a declared reverberation time, a MR system may continue to determine new reverberation times at step 702. If the new reverberation time is determined to be sufficiently different from a declared reverberation time, at step 708 it can be determined if a sufficient number of sufficiently different reverberation times has been detected. For example, three consecutive reverberation time estimates that are all sufficiently different from a declared reverberation item for a given frequency range may be a sufficient number of sufficiently different reverberation times. Other thresholds may also be used (e.g., three out of five most recent reverberation time estimates). If it is determined that a sufficient number of sufficiently different reverberation times has not been detected, a MR system may continue to determine new reverberation times at step 702. If it is determined that a sufficient number of sufficiently different reverberation times has been detected, a new reverberation time may be declared at step 710. In some embodiments, step 710 can also include initiating a new reverberation gain estimate, which can prompt a user to clap or play an impulse sound from an external speaker. In some embodiments, step 710 can also include accessing a remote database to identify a new real environment based on the new reverberation fingerprint and/or other information available to a MR system (e.g., location determined from GPS and/or WiFi connections, or via one or more sensors such as described above with respect to the example mixed reality system 200).

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method comprising:
receiving, at a first time, via a microphone of a wearable head device configured to present a view of a virtual environment, a first audio signal;
determining an envelope of the first audio signal;
estimating a first reverberation time based on the envelope of the first audio signal;
based on the estimated first reverberation time, determining that a location of the wearable head device at the first time corresponds to a first region of the virtual environment;
receiving, at a second time, via the microphone of the wearable head device, a second audio signal;
determining an envelope of the second audio signal;
estimating a second reverberation time based on the envelope of the second audio signal; and
based on the estimated second reverberation time, determining that a location of the wearable head device at the second time corresponds to a second region of the virtual environment, the second region different from the first region.

2. The method of claim 1, wherein said estimating the first reverberation time comprises determining if the envelope of the first audio signal is decaying for a time greater than a threshold amount of time.

3. The method of claim 1, wherein said estimating the first reverberation time comprises:
determining a linear fit of a decaying region in the envelope of the first audio signal; and
determining if the linear fit has a correlation greater than a threshold correlation.

4. The method of claim 1, further comprising estimating a first reverberation gain based on the envelope of the first audio signal, wherein determining that the location of the wearable head device at the first time corresponds to the first region of the virtual environment is based further on the estimated first reverberation gain.

5. The method of claim 4, wherein said estimating the first reverberation gain comprises prompting a user to clap.

6. The method of claim 4, wherein said estimating the first reverberation gain comprises presenting, via the speaker of the wearable head device, an impulse sound.

7. The method of claim 1, wherein:
determining the envelope of the first audio signal comprises applying a bandpass filter to the first audio signal; and
determining the envelope of the second audio signal comprises applying the bandpass filter to the second audio signal.

8. A system comprising:
a wearable head device configured to present a view of a virtual environment;
a microphone of the wearable head device; and
one or more processors configured to execute a method comprising:
receiving, at a first time, via the microphone of the wearable head device, a first audio signal;
determining an envelope of the first audio signal;
estimating a first reverberation time based on the envelope of the first audio signal;
based on the estimated first reverberation time, determining that a location of the wearable head device at the first time corresponds to a first region of the virtual environment;
receiving, at a second time, via the microphone of the wearable head device, a second audio signal;
determining an envelope of the second audio signal;
estimating a second reverberation time based on the envelope of the second audio signal; and
based on the estimated second reverberation time, determining that a location of the wearable head device at the second time corresponds to a second region of the virtual environment, the second region different from the first region.

9. The system of claim 8, wherein said estimating the first reverberation time comprises determining if the envelope of the first audio signal is decaying for a time greater than a threshold amount of time.

10. The system of claim 8, wherein said estimating the first reverberation time comprises:
determining a linear fit of a decaying region in the envelope of the first audio signal; and
determining if the linear fit has a correlation greater than a threshold correlation.

11. The system of claim 8, wherein the method further comprises estimating a first reverberation gain based on the envelope of the first audio signal, wherein determining that the location of the wearable head device at the first time corresponds to the first region of the virtual environment is based further on the estimated first reverberation gain.

12. The system of claim 11, wherein said estimating the first reverberation gain comprises prompting a user to clap.

13. The system of claim 11, wherein said estimating the first reverberation gain comprises presenting, via a speaker of the wearable head device, an impulse sound.

14. A non-transitory computer-readable medium storing instructions that, when executed by one or more processors, cause the one or more processors to execute a method comprising:
  receiving, at a first time, via a microphone of a wearable head device configured to present a view of a virtual environment, a first audio signal;
  determining an envelope of the first audio signal;
  estimating a first reverberation time based on the envelope of the first audio signal;
  based on the estimated first reverberation time, determining that a location of the wearable head device at the first time corresponds to a first region of the virtual environment;
  receiving, at a second time, via the microphone of the wearable head device, a second audio signal;
  determining an envelope of the second audio signal;
  estimating a second reverberation time based on the envelope of the second audio signal; and
  based on the estimated second reverberation time, determining that a location of the wearable head device at the second time corresponds to a second region of the virtual environment, the second region different from the first region.

15. The non-transitory computer-readable medium of claim 14, wherein said estimating the first reverberation time comprises determining if the envelope of the first audio signal is decaying for a time greater than a threshold amount of time.

16. The non-transitory computer-readable medium of claim 14, wherein said estimating the first reverberation time comprises:
  determining a linear fit of a decaying region in the envelope of the first audio signal; and
  determining if the linear fit has a correlation greater than a threshold correlation.

17. The non-transitory computer-readable medium of claim 14, wherein the method further comprises estimating a first reverberation gain based on the envelope of the first audio signal, wherein determining that the location of the wearable head device at the first time corresponds to the first region of the virtual environment is based further on the estimated first reverberation gain.

18. The non-transitory computer-readable medium of claim 17, wherein said estimating the first reverberation gain comprises prompting a user to clap.

19. The non-transitory computer-readable medium of claim 17, wherein said estimating the first reverberation gain comprises presenting, via a speaker of the wearable head device, an impulse sound.

20. The non-transitory computer-readable medium of claim 14, wherein:
  determining the envelope of the first audio signal comprises applying a bandpass filter to the first audio signal; and
  determining the envelope of the second audio signal comprises applying the bandpass filter to the second audio signal.

* * * * *